United States Patent
Idogawa et al.

(10) Patent No.: US 11,965,473 B2
(45) Date of Patent: Apr. 23, 2024

(54) CONTROLLER AND CONTROL METHOD FOR INTERNAL COMBUSTION ENGINE

(71) Applicant: TOYOTA JIDOSHA KABUSHIKI KAISHA, Aichi-ken (JP)

(72) Inventors: Masanao Idogawa, Nagoya (JP);
Rihito Kaneko, Miyoshi (JP);
Motohiro Sugimoto, Toyota (JP);
Takahiro Uchida, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/179,374

(22) Filed: Mar. 7, 2023

(65) Prior Publication Data
US 2023/0287844 A1    Sep. 14, 2023

(30) Foreign Application Priority Data
Mar. 14, 2022 (JP) ................. 2022-039003

(51) Int. Cl.
*F02D 41/30* (2006.01)

(52) U.S. Cl.
CPC ................. *F02D 41/3094* (2013.01)

(58) Field of Classification Search
CPC ........... F02D 13/0261; F02D 2200/703; F02D 41/0007; F02D 41/3094
See application file for complete search history.

(56) References Cited

U.S. PATENT DOCUMENTS

| | | | | |
|---|---|---|---|---|
| 10,066,569 B2 * | 9/2018 | Kawabe | ................. | F02D 41/107 |
| 2006/0144365 A1 * | 7/2006 | Miyashita | ............. | F02D 35/027 123/431 |
| 2011/0137470 A1 * | 6/2011 | Surnilla | ................. | G01C 21/26 700/282 |
| 2011/0209685 A1 * | 9/2011 | Shane | ................... | F02D 41/402 123/445 |
| 2015/0025777 A1 * | 1/2015 | Pursifull | ............. | F02D 41/0032 123/445 |
| 2016/0053693 A1 * | 2/2016 | Hokuto | ................... | F02B 33/34 60/285 |
| 2016/0090927 A1 * | 3/2016 | Kawabe | ................. | F02M 26/03 123/294 |

FOREIGN PATENT DOCUMENTS

| | | |
|---|---|---|
| EP | 3015693 A1 | 5/2016 |
| JP | 200646231 A | 2/2006 |
| JP | 2014134144 A | 7/2014 |
| JP | 2014-224461 A | 12/2014 |
| JP | 2016205172 A | 12/2016 |

* cited by examiner

*Primary Examiner* — Carl C Staubach
(74) *Attorney, Agent, or Firm* — HAUPTMAN HAM, LLP

(57) ABSTRACT

An internal combustion engine includes a port injection valve, a direct injection valve, and a forced-induction device. A ratio of an amount of fuel injected from the port injection valve with respect to a total amount of fuel supplied for one fuel combustion in the cylinder is defined as a port injection ratio. The internal combustion engine is controlled such that, in a case in which a condition is satisfied that the forced-induction device is in an operation of performing forced induction and the internal combustion engine is in an engine operation region in which a valve overlap period is greater than zero, the port injection ratio is set to be small and a start timing of fuel injection from the port injection valve is delayed as compared with a case in which the condition is not satisfied.

3 Claims, 3 Drawing Sheets

CONTROLLER AND CONTROL METHOD FOR INTERNAL COMBUSTION ENGINE

RELATED APPLICATIONS

The present application claims priority of Japanese Application Number 2022-039003 filed on Mar. 14, 2022, the disclosure of which is hereby incorporated by reference herein in its entirety.

BACKGROUND

1. Field

The present disclosure relates to a controller and a control method for an internal combustion engine.

2. Description of Related Art

The internal combustion engine disclosed in Japanese Laid-Open Patent Publication No. 2014-134144 includes a port injection valve, a direct injection valve, and a forced-induction device. The port injection valve injects fuel into an intake passage. The direct injection valve directly injects fuel into the cylinder without passing through the intake passage. The port injection valve and the direct injection valve inject fuel at an injection ratio determined for each engine operation region. The forced-induction device performs forced induction of intake air. When forced induction is performed by the forced-induction device, the pressure in the intake passage becomes higher than the pressure in the exhaust passage. The internal combustion engine includes an intake valve and an exhaust valve. In the internal combustion engine, a valve overlap period, in which the intake valve and the exhaust valve are simultaneously opened, exists.

In the internal combustion engine described in Japanese Laid-Open Patent Publication No. 2014-134144, a valve overlap period may occur when forced induction is being performed by a forced-induction device. In this case, the pressure in the intake passage is higher than the pressure in the exhaust passage as described above, and hence the intake air flowing into the cylinder from the intake passage blows through to the exhaust passage. Under such circumstances, when the port injection valve reaches an injection timing and injects fuel into the intake passage, the fuel blows through the exhaust passage together with the intake air.

As a countermeasure for preventing such blow-through of fuel, it is conceivable to start fuel injection by the port injection valve after the end of the valve overlap period. However, when the injection ratio from the port injection valve is large, the following concern arises. That is, when fuel injection from the port injection valve is started after the end of the valve overlap period, the port injection valve may not be able to inject the required fuel amount before the intake valve is closed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller for an internal combustion engine is provided. The internal combustion engine includes a port injection valve that injects fuel into an intake passage, a direct injection valve that directly injects fuel into a cylinder without passing through the intake passage, and a forced-induction device that performs forced induction of intake air. A ratio of an amount of fuel injected from the port injection valve with respect to a total amount of fuel supplied for one fuel combustion in the cylinder is defined as a port injection ratio. The controller includes processing circuitry. The processing circuitry is configured to, in a case in which a condition is satisfied that the forced-induction device is in an operation state of performing forced induction and the internal combustion engine is in an engine operation region in which a valve overlap period is greater than zero, set the port injection ratio to be small and delay a start timing of fuel injection from the port injection valve as compared with a case in which the condition is not satisfied.

In another general aspect, a control method for an internal combustion engine is provided. The internal combustion engine includes a port injection valve that injects fuel into an intake passage, a direct injection valve that directly injects fuel into a cylinder without passing through the intake passage, and a forced-induction device that performs forced induction of intake air. A ratio of an amount of fuel injected from the port injection valve with respect to a total amount of fuel supplied for one fuel combustion in the cylinder is defined as a port injection ratio. The control method includes, in a case in which a condition is satisfied that the forced-induction device is in an operation state in which the forced-induction device performs forced induction and the internal combustion engine is in an engine operation region in which a valve overlap period is greater than zero, setting the port injection ratio to be small and delaying a start timing of fuel injection from the port injection valve as compared with a case in which the condition is not satisfied.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, a controller 100 for an internal combustion engine 1 according to one embodiment will be described with reference to the drawings.

<Schematic Configuration of Internal Combustion Engine>

Figure 1:
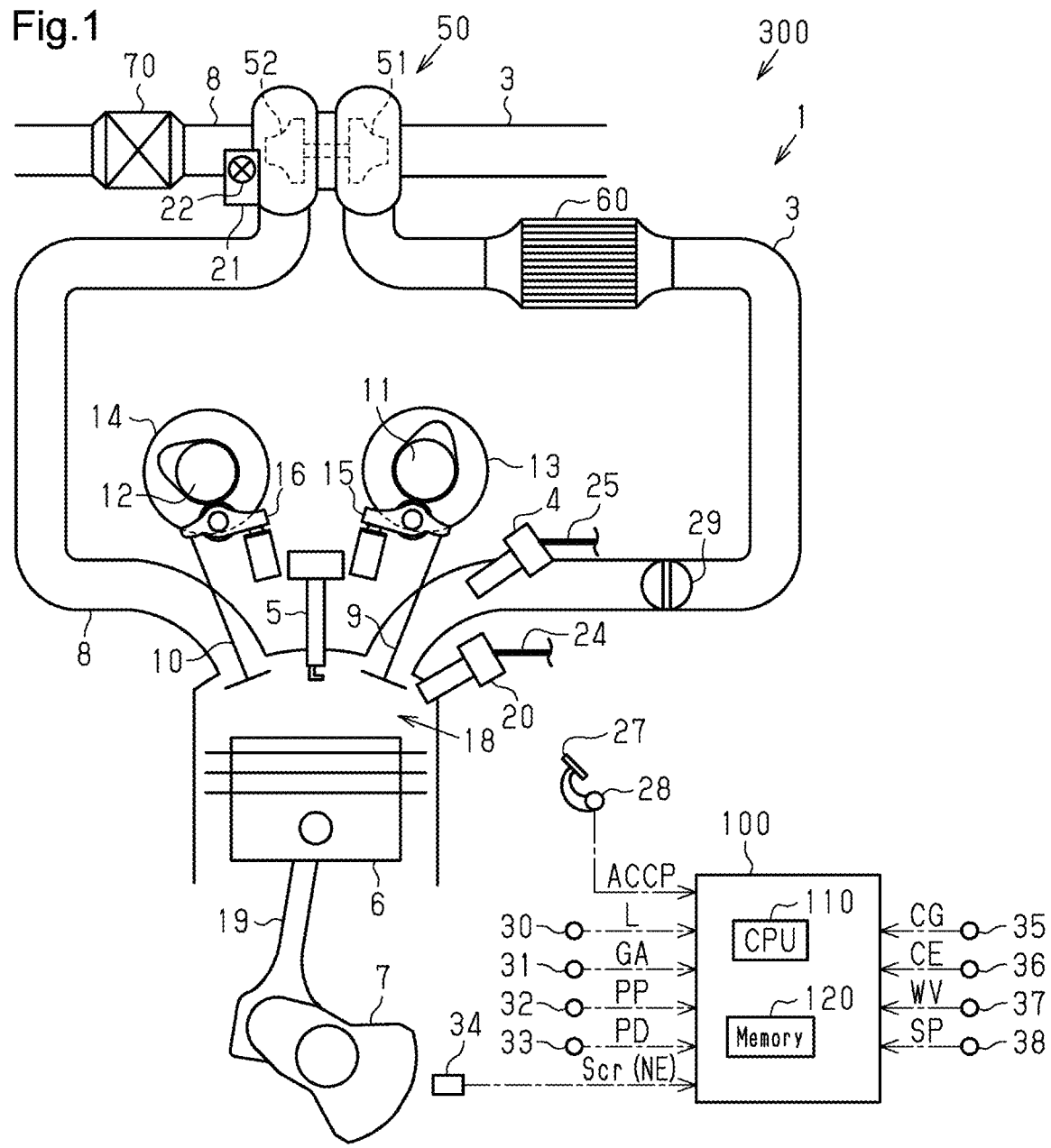
FIG. 1 is a schematic configuration diagram of an internal combustion engine.

As illustrated in FIG. 1, a vehicle 300 includes the internal combustion engine 1. The internal combustion engine 1 is a drive source of the vehicle 300. The internal combustion engine 1 has four cylinders 18, four pistons 6, four connecting rods 19, and a crankshaft 7. In FIG. 1, only one of the four cylinders 18 is illustrated. The same applies to the pistons 6 and the connecting rods 19.

The cylinder 18 is a space for combusting an air-fuel mixture of fuel and intake air (hereinafter, referred to as intake air). The piston 6 is provided for each cylinder 18. The piston 6 is located in the cylinder 18. The piston 6 reciprocates in the cylinder 18. The piston 6 is coupled to the crankshaft 7 by way of the connecting rod 19. The crankshaft 7 rotates according to the operation of the piston 6.

The internal combustion engine 1 has four ignition plugs 5. In FIG. 1, only one of the four ignition plugs 5 is shown. The ignition plug 5 is provided for each cylinder 18. The tip of the ignition plug 5 is located in the cylinder 18. The ignition plug 5 ignites the air-fuel mixture in the cylinder 18.

The internal combustion engine 1 includes four direct injection valves 20 and a first fuel passage 24. In FIG. 1, only one of the four direct injection valves 20 is shown. The direct injection valve 20 is provided for each cylinder 18. The direct injection valve 20 directly injects fuel into the cylinder 18 without passing through an intake passage 3, which will be described below. The first fuel passage 24 connects each direct injection valve 20 and the fuel tank. The first fuel passage 24 supplies fuel to each direct injection valve 20. The fuel tank stores fuel. In FIG. 1, illustration of the fuel tank is omitted.

The internal combustion engine 1 includes an intake passage 3, an intercooler 60, a throttle valve 29, four port injection valves 4, and a second fuel passage 25. In FIG. 1, only one of the four port injection valves 4 is shown. The intake passage 3 is a passage for introducing the intake air into each cylinder 18. The intake passage 3 is connected to each cylinder 18. The intercooler 60 is located in the middle of the intake passage 3. The intercooler 60 cools the intake air. The throttle valve 29 is located on the downstream side of the intercooler 60 in the intake passage 3. The opening degree of the throttle valve 29 can be adjusted. When the opening degree of the throttle valve 29 changes, the amount GA of intake air flowing through the intake passage 3 changes. That is, the throttle valve 29 adjusts the amount GA of intake air flowing through the intake passage 3. The port injection valve 4 is located on the downstream side of the throttle valve 29 in the intake passage 3. The port injection valve 4 is provided for each cylinder 18. The port injection valve 4 injects fuel into the intake passage 3. The second fuel passage 25 branches from the first fuel passage 24 and is connected to each port injection valve 4. The second fuel passage 25 supplies fuel to each port injection valve 4. The pressure (hereinafter referred to as a port fuel pressure) PP of the fuel supplied to the port injection valve 4 is different from the pressure (hereinafter referred to as a direct injection fuel pressure) PD of the fuel supplied to the direct injection valve 20.

The internal combustion engine 1 includes an exhaust passage 8 and a catalyst 70. The exhaust passage 8 is a passage for discharging exhaust air from the cylinder 18. The exhaust passage 8 is connected to each cylinder 18. The catalyst 70 is located in the middle of the exhaust passage 8. The catalyst 70 purifies the exhaust air flowing through the exhaust passage 8.

The internal combustion engine 1 includes a forced-induction device 50. The forced-induction device 50 is provided across the intake passage 3 and the exhaust passage 8. The forced-induction device 50 includes a compressor wheel 51, a turbine wheel 52, a bypass passage 21, and a waste gate valve (hereinafter referred to as a WGV) 22. The compressor wheel 51 is located on the upstream side of the intercooler 60 in the intake passage 3. The turbine wheel 52 is located on the upstream side of the catalyst 70 in the exhaust passage 8. The turbine wheel 52 rotates according to the flow of the exhaust air. The compressor wheel 51 rotates integrally with the turbine wheel 52. At this time, the compressor wheel 51 compresses and sends the intake air. That is, forced induction of the intake air is performed by the rotation of the compressor wheel 51. The bypass passage 21 connects a portion on the upstream side and a portion on the downstream side of the turbine wheel 52 in the exhaust passage 8. That is, the bypass passage 21 is a passage that bypasses the turbine wheel 52. The WGV 22 is located at the downstream end of the bypass passage 21. The opening degree of the WGV 22 can be adjusted. When the opening degree WV of the WGV 22 changes, the amount of exhaust air flowing through the bypass passage 21 changes. That is, the WGV 22 adjusts the amount of exhaust air flowing through the bypass passage 21. As the opening degree WV of the WGV 22 decreases, the amount of exhaust air flowing through the bypass passage 21 decreases. In this case, since the amount of exhaust air passing through the turbine wheel 52 increases, the rotation speeds of the turbine wheel 52 and the compressor wheel 51 increase. Then, the forced induction pressure increases.

The internal combustion engine 1 includes intake valves 9, intake rocker arms 15, an intake camshaft 11, and an intake valve variable device 13. In FIG. 1, only one of the intake valves 9 is shown. The same applies to the intake rocker arm 15. The intake valve 9 is provided for each cylinder 18. The intake valve 9 is located at a connection port with the cylinder 18 in the intake passage 3. The intake valve 9 is coupled to the intake camshaft 11 by way of the intake rocker arm 15. The intake valve 9 operates according to the rotation of the intake camshaft 11. With this operation, the intake valve 9 opens and closes the connection port of the intake passage 3. The rotation of the crankshaft 7 is transmitted to the intake camshaft 11. That is, the intake camshaft 11 rotates in cooperation with the crankshaft 7. The intake valve variable device 13 changes the relative rotational position of the intake camshaft 11 with respect to the rotational position (hereinafter referred to as a crank position) Scr of the crankshaft 7. As a result, the opening/closing timing of the intake valve 9 changes with respect to the crank position Scr. The intake valve variable device 13 is an electric type driven by an electric motor.

The internal combustion engine 1 includes exhaust valves 10, exhaust rocker arms 16, an exhaust camshaft 12, and an exhaust valve variable device 14. In FIG. 1, only one of the exhaust valves 10 is shown. The same applies to the exhaust rocker arm 16. The exhaust valve 10 is provided for each cylinder 18. The exhaust valve 10 is located at a connection port with the cylinder 18 in the exhaust passage 8. The exhaust valve 10 is coupled to the exhaust camshaft 12 by way of the exhaust rocker arm 16. The exhaust valve 10 operates according to the rotation of the exhaust camshaft 12. With this operation, the exhaust valve 10 opens and closes the connection port of the exhaust passage 8. Similarly to the intake camshaft 11, the exhaust camshaft 12 rotates in cooperation with the crankshaft 7. The exhaust valve variable device 14 changes the relative rotational position of the exhaust camshaft 12 with respect to the crank position Scr. As a result, the opening/closing timing of the exhaust valve 10 changes with respect to the crank position Scr. The exhaust valve variable device 14 is an electric type driven by an electric motor.

The internal combustion engine 1 includes a crank position sensor 34, an air flow meter 31, a first fuel-pressure sensor 32, and a second fuel-pressure sensor 33. In addition, the internal combustion engine 1 includes an intake cam position sensor 35, an exhaust cam position sensor 36, an opening sensor 37, and an atmospheric pressure sensor 30. The crank position sensor 34 detects a crank position Scr. The air flow meter 31 detects an amount GA of intake air flowing into the intake passage 3 from the outside. The first fuel-pressure sensor 32 detects the port fuel pressure PP. The second fuel-pressure sensor 33 detects the direct injection fuel-pressure PD. The intake cam position sensor 35 detects the rotational position CG of the intake camshaft 11. The exhaust cam position sensor 36 detects the rotational position CE of the exhaust camshaft 12. The opening sensor 37 detects the opening degree WV of the WGV 22. The atmospheric pressure sensor 30 detects the atmospheric pressure L at an altitude at which the internal combustion engine 1 is located. Each of these sensors repeatedly outputs a signal corresponding to information detected by the sensor itself to the controller 100 to be described later.

The vehicle 300 includes an accelerator pedal 27, an accelerator sensor 28, and a vehicle speed sensor 38. The accelerator pedal 27 is a foot pedal depressed by an occupant. The accelerator sensor 28 detects the depression amount of the accelerator pedal 27 as an accelerator operation amount ACCP. The vehicle speed sensor 38 detects the traveling speed of the vehicle 300 as a vehicle speed SP. Each of these sensors repeatedly outputs a signal corresponding to information detected by the sensor itself to the controller 100 to be described later.

<Schematic Configuration of Control Device>

As shown in FIG. 1, the vehicle 300 includes the controller 100. The controller 100 may include one or more processors that perform various processes according to computer programs (software). The processor includes a CPU 110 and a memory 120 such as a RAM and a ROM. The memory 120 stores program code or instructions configured to cause the CPU 110 to execute processes. The memory 120, which is a computer-readable medium, includes any type of media that are accessible by general-purpose computers and dedicated computers.

The controller 100 calculates the following parameters as needed based on the detection signals received from the various sensors. The controller 100 calculates the engine rotation speed NE, which is the rotation speed of the crankshaft 7, based on the crank position Scr detected by the crank position sensor 34. The controller 100 calculates the engine load factor KL based on the engine rotation speed NE and the amount GA of intake air detected by the air flow meter 31. The engine load factor KL represents a ratio of the present cylinder inflow intake air amount with respect to the cylinder inflow intake air amount when the internal combustion engine 1 is steadily operated in a state in which the throttle valve 29 is fully opened at the present engine rotation speed NE. The cylinder inflow intake amount is an amount GA of intake air flowing into each cylinder 18 in the intake stroke.

<Control of WGV>

The controller 100 controls various parts of the internal combustion engine 1 based on the detection signals received from the various sensors, each of the parameters calculated based thereon, and the like. For example, the controller 100 calculates a target load factor that is a target value of the engine load factor KL based on the accelerator operation amount ACCP or the like. Then, the controller 100 controls the throttle valve 29 and the WGV 22 so as to realize the target load factor. In controlling the WGV 22, the controller 100 refers to a forced induction map stored in advance. The forced induction map represents the relationship among the engine load factor KL, the opening degree WV of the WGV 22, and the atmospheric pressure L. The forced induction map is created based on, for example, an experiment or simulation. The forced induction map has the following contents. At the same atmospheric pressure L, the WGV 22 is fully open when the engine load factor KL is smaller than a certain threshold value, and the opening degree WV of the WGV 22 is smaller than fully open when the engine load factor KL is greater than or equal to a certain threshold value. Specifically, when the engine load factor KL is greater than or equal to the above threshold value, the opening degree WV of the WGV 22 becomes smaller as the engine load factor KL becomes greater than the above threshold value. In the forced induction map, the threshold value at which the WGV 22 is switched from the fully opened state to the opening degree smaller than the fully opened state is referred to as a forced induction start load factor KLA. In the engine operation state in which the engine load factor KL is greater than or equal to the forced induction start load factor KLA, the forced-induction device 50 performs forced induction. In the forced induction map, the forced induction start load factor KLA decreases as the atmospheric pressure L decreases. As a result, the accelerator operation amount ACCP switched to the forced induction state decreases as the atmospheric pressure L decreases. That is, the relationship between the parameters is determined so that the responsiveness of the engine output with respect to the accelerator operation amount ACCP instructed by the driver does not decrease even in an environment of a low atmospheric pressure L in which the engine output tends to decrease due to a decrease in oxygen density. The controller 100 calculates the opening degree WV of the WGV 22 corresponding to the target load factor as the target opening degree based on the forced induction map. Then, the controller 100 controls the WGV 22 so that the actual opening degree WV of the WGV 22 coincides with the target opening degree.

<Fuel Injection>

The controller 100 controls the port injection valve 4 and the direct injection valve 20. The controller 100 performs fuel injection from both the port injection valve 4 and the direct injection valve 20, or performs fuel injection from only one of them. The controller 100 changes the port injection ratio R, which is the ratio of the fuel amount injected from the port injection valve 4 with respect to the total fuel amount Fall supplied for one combustion of fuel in one cylinder 18, according to the engine operation state. The port injection ratio R takes a value of greater than or equal to 0 and smaller than or equal to 1. The port injection ratio R of 1 means that all the total fuel amount Fall is injected by the port injection valve 4. The port injection ratio R of 0 means that all the total fuel amount Fall is injected by the direct injection valve 20. The port injection ratio R of greater than or equal to 0 and smaller than or equal to 1 means that fuel injection is performed by both the port injection valve 4 and the direct injection valve 20. The total fuel amount Fall provided for one fuel combustion is a total fuel amount supplied to one cylinder 18 in one cycle of the internal combustion engine 1. One cycle of the internal combustion engine 1 is a series of periods that go through an intake stroke, a compression stroke, a combustion stroke, and an exhaust stroke one at a time in one cylinder 18.

Figure 2:
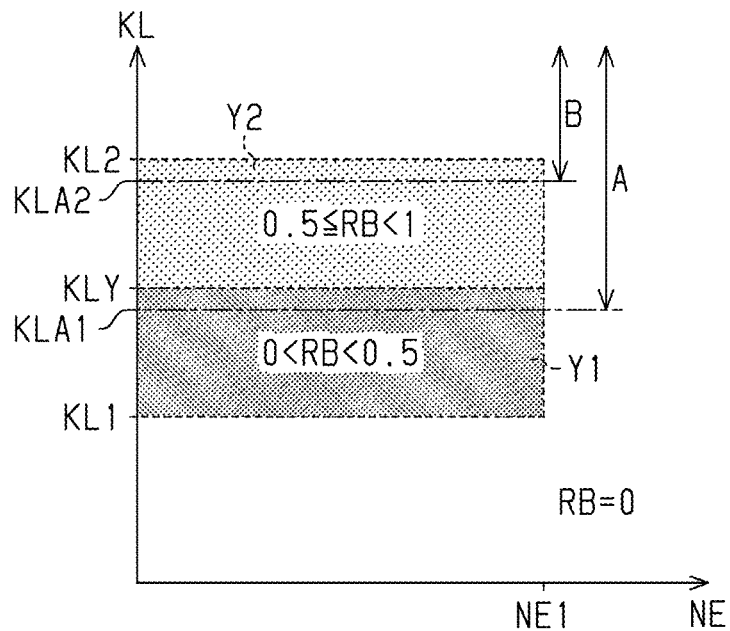
FIG. 2 is a diagram showing an example of a ratio map.

The controller 100 stores the ratio map in advance. The ratio map defines the basic port injection ratio RB, which is a base value of the port injection ratio R, for each engine operation region specified by the engine rotation speed NE and the engine load factor KL. The basic port injection ratio RB is an optimum port injection ratio R under standard atmospheric pressure. The ratio map is created based on, for example, an experiment or simulation. The ratio map is as follows. As illustrated in FIG. 2, in a high-rotation engine operation region in which the engine rotation speed NE is greater than or equal to a first value NE1, the basic port injection ratio RB is 0 regardless of the magnitude of the engine load factor KL. That is, in this engine operation region, fuel injection is performed only from the direct injection valve 20. On the other hand, in a low-rotation or medium-rotation engine operation region (hereinafter referred to as a specified rotation region) in which the engine rotation speed NE is smaller than the first value NE1, the basic port injection ratio RB changes according to the magnitude of the engine load factor KL. The setting of the basic port injection ratio RB in the specified rotation region will be described below. In the low-load engine operation region in which the engine load factor KL is smaller than the first load factor KL1 in the specified rotation region, the basic port injection ratio RB is 0. Even in a high-load engine operation region in which the engine load factor KL is greater than or equal to a second load factor KL2, the basic port injection ratio RB is 0. That is, in the low-load or high-load engine operation region, fuel is injected only from the direct injection valve 20 as in the high-rotation engine operation region. On the other hand, in the middle-load engine operation region, in which the engine load factor KL is greater than or equal to the first load factor KL1 and smaller than the second load factor KL2 in the specified rotation region, the basic port injection ratio RB is greater than 0. Specifically, in the first middle-load region Y1 in which the engine load factor KL is smaller than a specific load factor KLY in a middle-load engine operation region, the basic port injection ratio RB is greater than 0 and smaller than 0.5. That is, in the first middle-load region Y1, fuel is injected from both the port injection valve 4 and the direct injection valve 20, and the amount of fuel injected from the direct injection valve 20 is greater than that of the port injection valve 4. On the other hand, in the second middle-load region Y2 in which the engine load factor KL is greater than or equal to the specific load factor KLY in the middle-load engine operation region, the basic port injection ratio RB is greater than or equal to 0.5 and smaller than 1. That is, in the second middle-load region Y2, fuel is injected from both the port injection valve 4 and the direct injection valve 20, and the amount of fuel injected from the port injection valve 4 is greater than that of the direct injection valve 20.

In the ratio map, the engine operation region such as the medium load and the high load and the forced induction start load factor KLA have the following relationship. The forced induction start load factor KLA2 when the atmospheric pressure L is close to the standard atmospheric pressure is slightly smaller than the second load factor KL2. That is, in a low altitude area where the atmospheric pressure L is close to the standard atmospheric pressure, there are many opportunities to perform forced induction in a high-load engine operation region in which the port injection ratio R becomes 0 as a whole. In FIG. 2, an engine operation region in which forced induction is performed in a low altitude area is indicated by B. As described in the forced induction map, the forced induction start load factor KLA decreases as the atmospheric pressure L decreases. Therefore, as the atmospheric pressure L becomes lower than the standard atmospheric pressure, the forced induction start load factor KLA becomes smaller than the second load factor KL2. Then, the forced induction start load factor KLA1 in an area where a high altitude to some extent such as an altitude of 1000 m, for example, among the altitude ranges in which the road can exist is slightly smaller than the specific load factor KLY. Therefore, as illustrated in the range A of FIG. 2, in the high altitude area, the engine operation region in which forced induction is performed is enlarged toward the low-load engine operation region as compared with the low altitude area. In the high altitude area, there are many opportunities to perform forced induction not only in the high-load engine operation region in which the basic port injection ratio RB is 0 but also in the second middle-load region Y2 in which the basic port injection ratio RB is greater than or equal to 0.5 and smaller than 1. In the following description, all the engine operation regions such as low load, medium load, and high load are based on the ratio map.

<Opening/Closing Timing of Intake Valve and Exhaust Valve>

The controller 100 controls the intake valve variable device 13. Accordingly, the controller 100 adjusts the intake valve timing which is the opening/closing timing of the intake valve 9. In the present embodiment, the controller 100 treats a state in which the intake valve timing is the timing on the most retarded side as an initial value of 0. Then, the controller 100 adjusts the intake valve timing by adjusting the advancement amount of the intake valve timing from the initial value. Upon adjusting the intake valve timing, the controller 100 calculates a target advancement amount that is a target value of the advancement amount of the intake valve timing based on the engine rotation speed NE, the engine load factor KL, and the like. Then, the controller 100 controls the intake valve variable device 13 so that the advancement amount of the actual intake valve timing matches the target advancement amount. A specific one of the four cylinders 18 is referred to as a reference cylinder. The controller 100 stores in advance the crank position Scr at which the intake valve 9 of the reference cylinder reaches the valve opening timing when the intake valve timing is at the initial value. Therefore, the controller 100 acquires the crank position Scr at which the intake valve 9 of the reference cylinder reaches the valve opening timing at the present state by calculating the crank position Scr advanced by the target advancement amount with respect to the crank position Scr. Similarly, the controller 100 stores in advance the crank position Scr at which the intake valve 9 of the reference cylinder reaches the valve closing timing when the intake valve timing is at the initial value. Therefore, the controller 100 acquires the crank position Scr at which the intake valve 9 of the reference cylinder reaches the valve closing timing at the present state.

The controller 100 controls the exhaust valve variable device 14. As a result, the controller 100 adjusts the exhaust valve timing, which is the opening/closing timing of the exhaust valve 10. In the present embodiment, the controller 100 treats a state in which the exhaust valve timing is the timing on the most advanced side as an initial value of 0. Then, the controller 100 adjusts the exhaust valve timing by adjusting the retardation amount of the exhaust valve timing from the initial value. Upon adjusting the exhaust valve timing, the controller 100 calculates a target retardation amount that is a target value of the retardation amount of the exhaust valve timing based on the engine rotation speed NE, the engine load factor KL, and the like. Then, the controller 100 controls the exhaust valve variable device 14 so that the retardation amount of the actual exhaust valve timing matches the target retardation amount. The controller 100 stores in advance the crank position Scr at which the exhaust valve 10 of the reference cylinder reaches the valve opening timing and the crank position Scr at which the exhaust valve reaches the valve closing timing when the exhaust valve timing is at the initial value. Therefore, as in the case of the intake valve 9, the controller 100 acquires the crank position Scr at which the exhaust valve 10 of the reference cylinder reaches the valve opening timing and the crank position Scr at which the exhaust valve reaches the valve closing timing at the present state.

The controller 100 changes the valve overlap period VO, in which both the intake valve 9 and the exhaust valve 10 are in the valve open state, according to the engine operation region by adjusting the advancement amount of the intake valve timing and the retardation amount of the exhaust valve timing. Specifically, the controller 100 increases the advancement amount of the intake valve timing in the medium-load and high-load engine operation regions as compared with the low-load engine operation region. In addition, the controller 100 increases the retardation amount of the exhaust valve timing in the medium-load and high-load engine operation regions as compared with the low-load engine operation region. As a result, the controller 100 lengthens the valve overlap period VO and delays the end timing VOE of the valve overlap period VO in the medium-load and high-load engine operation regions as compared with the low-load engine operation region. The end timing VOE of the valve overlap period VO is the valve closing timing of the exhaust valve 10. The controller 100 basically sets the valve overlap period VO to be greater than 0 in each engine operation region, but may set the valve overlap period VO to 0 in a low-load engine operation region.

As described above, the medium-load and high-load engine operation regions are engine operation regions in which forced induction is performed by the forced-induction device 50. That is, the controller 100 increases the valve overlap period VO to a relatively long period in the engine operation region in which forced induction is performed. When forced induction is performed by the forced-induction device 50, the pressure in the intake passage 3 becomes higher than the pressure in the exhaust passage 8. At this time, when both the intake valve 9 and the exhaust valve 10 are in a valve open state, scavenging for drawing intake air into the cylinder 18 and scavenging exhaust air from the cylinder 18 is performed, so that engine output is increased. From such a standpoint, it is effective to lengthen the valve overlap period VO when forced induction is performed by the forced-induction device 50. The controller 100 may lengthen the valve overlap period VO when forced induction is not being performed by the forced-induction device 50, for example, in a medium-load engine operation region in a low altitude area. This is intended to reduce NOx and improve fuel efficiency by enhancing the effect of so-called internal exhaust gas recirculation.

<Normal Injection Control>

The controller 100 performs a normal injection control when a specific condition described later is not satisfied during operation of the internal combustion engine 1. In the normal injection control, the controller 100 first calculates a total fuel amount Fall supplied for one fuel combustion in one cylinder 18 based on the present engine rotation speed NE, the engine load factor KL, and the like. Next, the controller 100 calculates the basic port injection ratio RB corresponding to the present engine rotation speed NE and engine load factor KL in the ratio map. Then, the controller 100 calculates the basic port injection amount FPB, which is the fuel injection amount of the port injection valve 4 corresponding to the basic port injection ratio RB, based on the total fuel amount Fall and the basic port injection ratio RB. In addition, the controller 100 calculates the basic direct injection amount FDB, which is the fuel injection amount of the direct injection valve 20 corresponding to the basic port injection ratio RB, based on the total fuel amount Fall and the basic port injection ratio RB. Then, the controller 100 injects fuel for the basic port injection amount FPB from the port injection valve 4. In addition, the controller 100 injects fuel for the basic direct injection amount FDB from the direct injection valve 20. The controller 100 sequentially performs such fuel injection in the four cylinders 18. The controller 100 repeats the normal injection control including the above series of processes. In the normal injection control, the controller 100 sets the start timing (hereinafter referred to as a port injection timing) FPS of the fuel injection of the port injection valve 4 to a prompt time after the opening of the intake valve 9. Furthermore, in the normal injection control, the controller 100 sets the start timing (hereinafter referred to as a direct injection timing) FDS of the fuel injection of the direct injection valve 20 to an appropriate time corresponding to the basic direct injection amount FDB.

<Outline of Specific Injection Control>

The controller 100 performs specific injection control when the specific condition is satisfied. The specific condition is that both of the following two items are satisfied.
  (A) It is an engine operation state in which the forced-induction device 50 performs forced induction.
  (B) It is an engine operation region in which the valve overlap period VO is greater than 0.

The item (A) is a state in which the engine load factor KL is greater than or equal to the forced induction start load factor KLA. In addition, regarding the item (B), as described above, the valve overlap period VO is greater than 0 in the medium-load and high-load engine operation regions, which are the engine operation regions in which the forced-induction device 50 performs forced induction. Therefore, the item (B) is necessarily satisfied when the item (A) is satisfied.

When the valve overlap period VO is reached while forced induction is being performed by the forced-induction device 50, scavenging is promoted, and the following phenomenon also occurs. That is, the intake air flowing into the cylinder 18 from the intake passage 3 directly blows through the exhaust passage 8. At this time, when the port injection valve 4 reaches the injection timing and injects fuel into the intake passage 3, the fuel is blown through the exhaust passage 8 with the intake air. The specific injection control is dedicated fuel injection control for preventing such blow-through of fuel. Specifically, in the specific injection control, the port injection ratio R is set to be smaller than that in the normal injection control, and the start timing of the fuel injection from the port injection valve 4 is delayed.

In the specific injection control, the controller 100 performs two-stage treatment in setting the port injection ratio R to be small. In the first treatment, the controller 100 corrects the basic port injection ratio RB according to the atmospheric pressure L of the point at which the vehicle 300 is located. The reason for performing the correction in consideration of the atmospheric pressure L will be described in the section of operation described later. The controller 100 stores a correction map in advance as information for performing correction according to the atmospheric pressure L. The correction map represents the relationship between the atmospheric pressure L and the correction value H for correcting the port injection ratio R. The correction map is created based on, for example, an experiment or simulation. In the correction map, the smaller the correction value H, the lower the atmospheric pressure L becomes. The correction value H is a value of less than or equal to 1. The controller 100 calculates a value obtained by multiplying the basic port injection ratio RB by the correction value H as the corrected port injection ratio RM. Therefore, for the same basic port injection ratio RB, the corrected port injection ratio RM becomes smaller as the atmospheric pressure L becomes lower. In other words, the corrected port injection ratio RM is set to a value at which the amount of decrease from the basic port injection ratio RB increases as the atmospheric pressure L decreases. In the first treatment, the port injection ratio R is set again to the corrected port injection ratio RM at which the amount of decrease from the basic port injection ratio RB increases as the atmospheric pressure L decreases.

The controller 100 performs the second treatment only in a case in which the blow-through of the fuel still cannot be prevented even when the first treatment is performed. The fuel injection amount of the port injection valve 4 corresponding to the corrected port injection ratio RM is referred to as a set port injection amount FPU. The amount of fuel that can be injected from the port injection valve 4 in a period from the port injection timing FPS, which is the start timing of fuel injection of the port injection valve 4, to the closing of the intake valve 9 is referred to as an allowable port injection amount FPA. In the second treatment, the controller 100 injects the allowable port injection amount FPA from the port injection valve 4 instead of the set port injection amount FPU. Then, the controller 100 covers the difference between the allowable port injection amount FPA and the set port injection amount FPU by the injection from the direct injection valve 20. That is, in the second treatment, the controller 100 resets the port injection ratio R so that the amount of fuel injected from the port injection valve 4 becomes the allowable port injection amount FPA instead of the corrected port injection ratio RM calculated in the first treatment.

The controller 100 stores a port injection map in advance as information necessary for calculating the allowable port injection amount FPA. It is assumed that fuel is injected from the port injection valve 4 for a certain injection period under a certain port fuel pressure PP. At this time, the amount of fuel injected by the port injection valve 4 is referred to as a possible injection amount. The possible injection amount varies according to the injection period. The port injection map represents the relationship between the injection period and the possible injection amount for each port fuel pressure PP. In the port injection map, the injection period, the possible injection amount, and the port fuel pressure PP have the following relationship. When viewed at a certain port fuel pressure PP, the possible injection amount increases as the injection period becomes longer. Furthermore, when the injection period is the same, the possible injection amount increases as the port fuel pressure PP becomes higher. The port injection map is created based on, for example, an experiment or simulation.

In the specific injection control, the controller 100 calculates a port injection timing FPS dedicated to the specific injection control. In the present embodiment, the controller 100 sets the port injection timing FPS to the end timing VOE of the valve overlap period VO, that is, the timing after the valve overlap period VO. The end timing VOE of the valve overlap period VO is the valve closing timing of the exhaust valve 10. The port injection timing FPS determined by the controller 100 in the specific injection control is a timing later than the port injection timing FPS in the normal injection control. Here, the port injection timing FPS of the normal injection control to be compared is the port injection timing FPS when the normal injection control is performed in a situation in which only (B) of the items (A) and (B) is satisfied. The reason why the normal injection control in a situation in which only (B) is satisfied is used as the comparison target with the specific injection control will be described later. Now, a situation in which only (B) of the items (A) and (B) is satisfied is the following situation. For example, this is a situation in which the vehicle 300 is located at a point close to the standard atmospheric pressure such as a low land, and the engine operation region is in the second middle-load region Y2. Alternatively, this is a situation in which the engine operation region is in the first middle-load region Y1 regardless of the atmospheric pressure L at which the vehicle 300 is located. In these cases, since (A) is not satisfied, the specific condition is not satisfied. However, the length and the end timing VOE of the valve overlap period VO defined from the engine operation region are substantially the same as those in the situation in which the specific condition is satisfied, that is, during the forced induction in the high land and second middle-load region Y2. When the specific condition is not satisfied, the problem of blow-through of the fuel does not occur, and thus the fuel injection of the port injection valve 4 can be started without waiting for the end timing VOE of the valve overlap period VO. Therefore, the port injection timing FPS of the normal injection control in a situation in which only (B) is satisfied is set before the end timing VOE of the valve overlap period VO. On the other hand, in the specific injection control, the controller 100 sets the port injection timing FPS to the end timing VOE of the valve overlap period VO in order to avoid the blow-through of the fuel. That is, in the specific injection control, the port injection timing FPS is delayed as compared with the normal injection control when the length of the valve overlap period VO and the end timing VOE are under the same condition.

The reason why the port injection timing FPS of the normal injection process performed in a situation in which only (B) is satisfied is used as a comparison target with the port injection timing FPS of the specific injection control is as follows. The situation in which the normal injection process is executed is a situation in which the specific process is not established. That is, it is a first situation which is a situation in which only one of the items (A) and (B) is satisfied, or a second situation which is a situation in which neither the item (A) nor the item (B) is satisfied. Regarding the first situation, a situation in which only the item (A) is satisfied does not occur due to the setting of the valve overlap period VO of the present embodiment. Therefore, in the first situation, there is only a situation in which only (B)

is actually satisfied. Furthermore, regarding the second situation, the situation in which neither the item (A) nor the item (B) is satisfied is a situation in which the internal combustion engine 1 is in the low-load engine operation region. As illustrated in FIG. 2, in the low-load engine operation region, the port injection ratio R is 0, and fuel injection from the port injection valve 4 is not performed. That is, in a situation in which neither the item (A) nor the item (B) is satisfied, there is no port injection timing FPS. Under such circumstances, the port injection timing FPS of the normal injection process in a situation in which only (B) is satisfied is used as a comparison target with the port injection timing FPS of the specific control process.

In the specific injection control, the controller 100 calculates the direct injection timing FDS dedicated to the specific injection control. As described above, the direct injection timing FDS is the fuel injection start timing of the direct injection valve 20. The fuel injection amount of the direct injection valve 20 corresponding to the corrected port injection ratio RM calculated in the first treatment is referred to as a set direct injection amount FDU. The controller 100 determines the direct injection timing FDS based on the set direct injection amount FDU regardless of whether the second treatment is performed after the first treatment. The controller 100 determines the direct injection timing FDS as a timing in consideration of the following points. The fuel injected into the cylinder 18 by the direct injection valve 20 is atomized in the cylinder 18. The heat of vaporization at this time cools the periphery of the ignition plug 5. Therefore, when the direct injection timing FDS is brought as close as possible to the ignition timing set in the vicinity of the compression top dead center, ignition can be performed under a situation in which the temperature of the periphery of the ignition plug 5 is made relatively low by the heat of vaporization described above. This is effective in suppressing damage to the ignition plug 5. On the other hand, if the fuel is injected from the direct injection valve 20 when the piston 6 is at a position close to the top dead center, the fuel adheres to the top surface of the piston 6 and the fuel is less likely to be atomized. In this case, the fuel discharged to the exhaust passage 8 in an unburned state increases. Therefore, from the standpoint of exhaust emission, it is preferable to set the direct injection timing FDS to timing that is maximally earlier than the compression top dead center, such as when the piston 6 is located in the vicinity of the bottom dead center, for example. In consideration of the protection of the ignition plug 5, exhaust emission, and the like, the controller 100 determines the optimum timing in injecting the set direct injection amount FDU from the direct injection valve 20 as the direct injection timing FDS. A period required for injecting the set direct injection amount FDU from the direct injection valve 20 is referred to as a necessary period. In the present embodiment, the controller 100 sets the direct injection timing FDS to the crank position Scr that is earlier by the necessary extent than a predetermined specified crank position. The specified crank position is determined, for example, on the basis of an experiment or a simulation as an optimum crank position Scr as a reference in determining the direct injection timing FDS from the above standpoint among the crank positions Scr until the piston 6 reaches the top dead center from the bottom dead center in the compression stroke. The controller 100 stores the specified crank position for the reference cylinder in advance. Further details of the method of determining the direct injection timing FDS will be described later. The direct injection timing FDS set by the controller 100 is a timing after the end timing VOE of the valve overlap period VO in relation to the following matter. The above matter is that the correction value H of the correction map is adjusted so that the set direct injection amount FDU, which is the calculation base of the necessary period, does not become excessively large.

The controller 100 stores the direct injection map in advance as information necessary for calculating the necessary period. The direct injection map is created for the direct injection valve 20 in the same manner as the port injection map. That is, the direct injection map represents the relationship between the injection period and the possible injection amount for each direction injection fuel pressure PD. The possible injection amount is the amount of fuel injected by the direct injection valve 20 in a constant injection period under a constant direct injection fuel pressure PD. The basic relationship of each parameter in the direct injection map is the same as that in the port injection map. The direct injection map is created based on, for example, an experiment or simulation.

<Specific Processing Contents of Specific Injection Control>

The controller 100 repeatedly determines whether the specific condition is satisfied during the operation of the internal combustion engine 1. Then, when the specific condition is satisfied, the controller 100 cancels the normal injection control and performs the specific injection control. The controller 100 repeats the specific injection control while a situation in which the specific condition is satisfied continues. At this time, the controller 100 performs a specific injection control once per cycle of the internal combustion engine 1. In this specific injection control, the reference cylinder is set to the cylinder 18 that performs the fuel injection first among the four cylinders 18.

Figure 5:
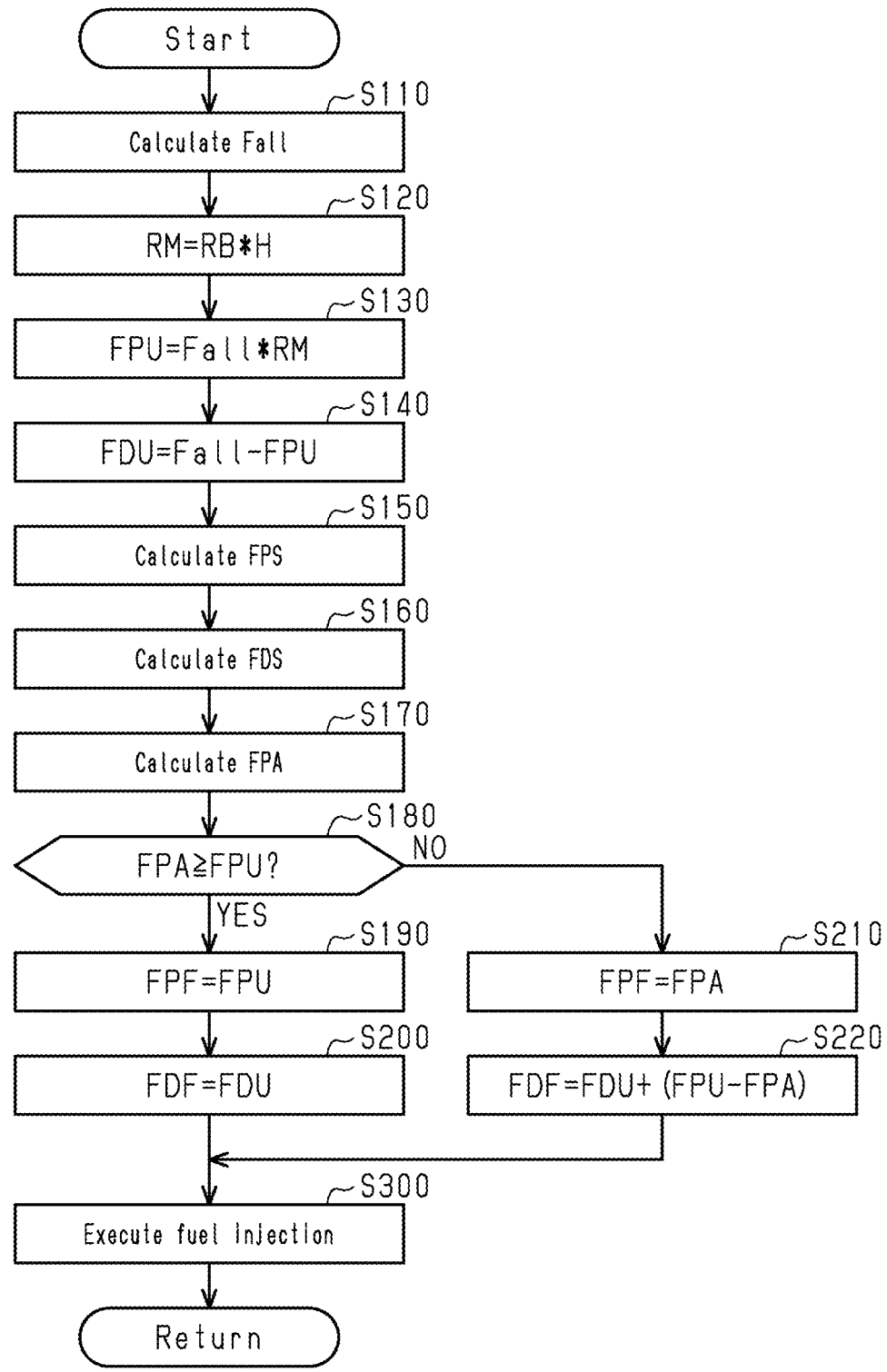
FIG. 5 is a flowchart showing a processing procedure of a specific injection control.

As illustrated in FIG. 5, when the specific injection control is started, the controller 100 first performs the process of step S110. In step S110, the controller 100 calculates the total fuel amount Fall supplied for one fuel combustion in one cylinder 18. The controller 100 refers to the latest engine rotation speed NE, the latest engine load factor KL, and the like. Then, the controller 100 calculates the total fuel amount Fall based thereon. For example, the controller 100 stores a map representing the relationship among the engine rotation speed NE, the engine load factor KL, and the total fuel amount Fall. The controller 100 calculates the total fuel amount Fall based on such a map. After calculating the total fuel amount Fall, the controller 100 advances the process to step S120.

In step S120, the controller 100 calculates the corrected port injection ratio RM. Specifically, the controller 100 refers to the latest engine rotation speed NE, the latest engine load factor KL, and the ratio map. Then, the controller 100 calculates the basic port injection ratio RB corresponding to the latest engine rotation speed NE and the latest engine load factor KL based on the ratio map. Next, the controller 100 refers to the latest atmospheric pressure L and the correction map. Then, the controller 100 calculates the correction value H corresponding to the latest atmospheric pressure L based on the correction map. Thereafter, the controller 100 multiplies the basic port injection ratio RB calculated from the ratio map by the correction value H calculated from the correction map. Then, the controller 100 sets the corrected port injection ratio RM to the obtained value. Thereafter, the controller 100 advances the process to step S130.

In step S130, the controller 100 calculates the set port injection amount FPU. As described above, the set port injection amount FPU is the fuel injection amount of the port injection valve 4 corresponding to the corrected port injection ratio RM. As a specific process of step S130, the controller 100 multiplies the total fuel amount Fall calculated in step S110 by the corrected port injection ratio RM calculated in step S120. Then, the controller 100 sets the set port injection amount FPU to the obtained value. Thereafter, the controller 100 advances the process to step S140.

In step S140, the controller 100 calculates the set direct injection amount FDU. As described above, the set direct injection amount FDU is the fuel injection amount of the direct injection valve 20 corresponding to the corrected port injection ratio RM. As a specific process of step S140, the controller 100 subtracts the set port injection amount FPU calculated in step S130 from the total fuel amount Fall calculated in step S110. Then, the controller 100 sets the set direct injection amount FDU to the obtained value. Thereafter, the controller 100 advances the process to step S150. The processes of steps S120, S130, and S140 are the first treatment of the specific injection control.

In step S150, the controller 100 calculates a port injection timing FPS which is a start timing of fuel injection of the port injection valve 4. First, the controller 100 calculates the port injection timing FPS for the reference cylinder. Specifically, the controller 100 refers to the latest value of the target retardation amount for adjusting the retardation amount of the exhaust valve timing. In addition, the controller 100 refers to the crank position Scr at which the exhaust valve 10 of the reference cylinder reaches the valve closing timing when the exhaust valve timing is the initial value. Then, the controller 100 calculates a crank position Scr retarded from the crank position Scr by the target retardation amount as the crank position Scr at which the exhaust valve 10 of the reference cylinder reaches the valve closing timing at the present state. Then, the controller 100 sets the crank position Scr of the port injection timing FPS in the reference cylinder to the calculated crank position Scr. Thereafter, the controller 100 calculates the port injection timing FPS for the three cylinders 18 other than the reference cylinder. Specifically, the controller 100 sets the crank position Scr of the port injection timing FPS for each cylinder 18 to the crank position Scr advanced by 180 degrees from the port injection timing FPS of the reference cylinder in the order of the cylinder 18 in the combustion stroke. Thereafter, the controller 100 advances the process to step S160.

In step S160, the controller 100 calculates the direct injection timing FDS which is the start timing of the fuel injection of the direct injection valve 20. First, the controller 100 calculates the direct injection timing FDS for the reference cylinder. Specifically, the controller 100 refers to the latest direct injection fuel pressure PD, the set direct injection amount FDU calculated in step S140, and the direct injection map. Then, the controller 100 calculates the injection period corresponding to the latest direct injection fuel pressure PD and the set direct injection amount FDU as the necessary period based on the direct injection map. At this time, the controller 100 may apply the set direct injection amount FDU to the possible injection amount in the direct injection map. As described above, the necessary period is a period required for injecting the set direct injection amount FDU from the direct injection valve 20. After calculating the necessary period, the controller 100 calculates the necessary crank amount obtained by converting the necessary period into the rotation amount of the crankshaft 7. The controller 100 calculates the necessary crank amount based on the necessary period and the latest engine rotation speed NE. Thereafter, the controller 100 refers to the specified crank position of the reference cylinder stored in advance. Then, the controller 100 calculates the crank position Scr that is earlier by a necessary crank amount than the specified crank position as the crank position Scr of the direct injection timing FDS in the reference cylinder. Thereafter, the controller 100 calculates the direct injection timing FDS for the three cylinders 18 other than the reference cylinder. Specifically, the controller 100 sets the crank position Scr of the direct injection timing FDS for each cylinder 18 to the crank position Scr advanced by 180 degrees from the direct injection timing FDS of the reference cylinder in the order of the cylinder 18 reaching the combustion stroke. Thereafter, the controller 100 advances the process to step S170.

In step S170, the controller 100 calculates the allowable port injection amount FPA. As described above, the allowable port injection amount FPA is the amount of fuel that can be injected from the port injection valve 4 in the period from the port injection timing FPS to the valve closing timing of the intake valve 9. As a specific process of step S170, the controller 100 first calculates the valve closing timing of the intake valve 9 of the reference cylinder. Specifically, the controller 100 refers to the latest value of the target advancement amount for adjusting the advancement amount of the intake valve timing. In addition, the controller 100 refers to the crank position Scr at which the intake valve 9 of the reference cylinder reaches the valve closing timing when the intake valve timing is the initial value. Then, the controller 100 calculates a crank position Scr advanced by a target advancement amount from the crank position Scr as the crank position Scr at which the intake valve 9 of the reference cylinder reaches the valve closing timing. Thereafter, the controller 100 calculates an allowable rotation amount. The allowable rotation amount is the magnitude of the rotation angle at which the crankshaft 7 rotates between the crank position Scr at the port injection timing FPS of the reference cylinder calculated in step S150 and the crank position Scr at the valve closing timing of the intake valve 9 of the reference cylinder. After calculating the allowable rotation amount, the controller 100 converts the allowable rotation amount into a unit of time based on the allowable rotation amount and the latest engine rotation speed NE. Then, the controller 100 uses the obtained value as an allowable period. Thereafter, the controller 100 refers to the latest port fuel pressure PP and the port injection map. Then, the controller 100 calculates the possible injection amount corresponding to the latest port fuel pressure PP and the allowable period based on the port injection map. At this time, the controller 100 may apply the above-described allowable period to the injection period in the port injection map. When calculating the possible injection amount from the port injection map, the controller 100 sets the an allowable port injection amount FPA to the calculated value. Thereafter, the controller 100 advances the process to step S180.

In step S180, the controller 100 determines whether the allowable port injection amount FPA calculated in step S170 is greater than or equal to the set port injection amount FPU calculated in step S130. When the allowable port injection amount FPA is greater than or equal to the set port injection amount FPU (step S180: YES), the controller 100 advances the process to step S190.

In step S190, the controller 100 calculates the target port injection amount FPF. The target port injection amount FPF is a target value of the amount of fuel injected from the port injection valve 4. As a specific process of step S190, the controller 100 calculates the set port injection amount FPU calculated in step S130 as the target port injection amount FPF as it is. Thereafter, the controller 100 advances the process to step S200.

In step S200, the controller 100 calculates the target direct injection amount FDF. The target direct injection amount FDF is a target value of the amount of fuel injected from the direct injection valve 20. As a specific process of step S200, the controller 100 calculates the set direct injection amount FDU calculated in step S140 as the target direct injection amount FDF as it is. Thereafter, the controller 100 advances the process to step S300.

On the other hand, in step S180, when the allowable port injection amount FPA is less than the set port injection amount FPU (step S180: NO), the controller 100 advances the process to step S210. Then, in step S210, the controller 100 calculates the target port injection amount FPF. Specifically, the controller 100 calculates the allowable port injection amount FPA calculated in step S170 as the target port injection amount FPF. Thereafter, the controller 100 advances the process to step S220. The processes of steps S210 and S220 are the second treatment of the specific injection control.

In step S220, the controller 100 calculates the target direct injection amount FDF. Specifically, the controller 100 calculates a value obtained by subtracting the allowable port injection amount FPA calculated in step S170 from the set port injection amount FPU calculated in step S130 as a difference value N. Then, the controller 100 calculates a value obtained by adding the difference value N and the set direct injection amount FDU calculated in step S140 as the target direct injection amount FDF. Thereafter, the controller 100 advances the process to step S300. The controller 100 promptly performs a series of processes from step S110 to step S220 described above before the start of fuel injection to the reference cylinder.

In step S300, fuel injection from each port injection valve 4 and each direct injection valve 20 is executed. Specifically, the controller 100 starts fuel injection from each port injection valve 4 at the port injection timing FPS for each cylinder 18 calculated in step S150. At this time, the controller 100 injects fuel for the target port injection amount FPF from each port injection valve 4. The controller 100 starts fuel injection from each direct injection valve 20 at the direct injection timing FDS for each cylinder 18 calculated in step S160. At this time, the controller 100 injects fuel for the target direct injection amount FDF from each direct injection valve 20. When the fuel injection into the four cylinders 18 is completed, the controller 100 temporarily ends a series of processes of the specific injection control. Then, the controller 100 performs the process of step S110 again.

Operation of Embodiment

Figure 3:
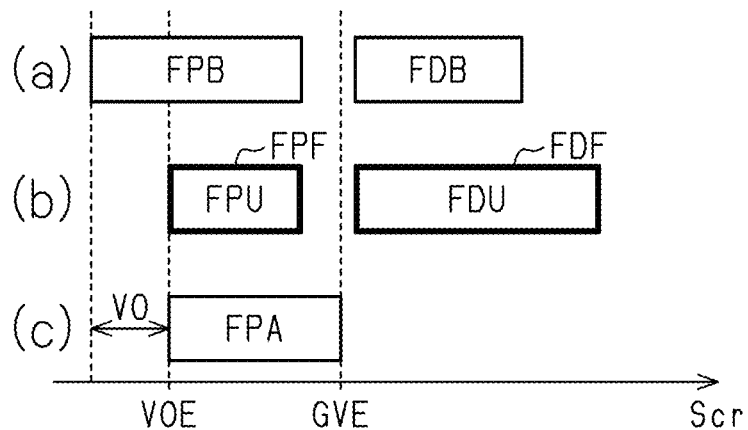
FIG. 3 is a diagram showing an example of setting of a fuel injection amount according to a first treatment.

As already described with reference to FIG. 2, when the atmospheric pressure L decreases, the engine operation region in which the forced-induction device 50 performs forced induction expands toward the low-load engine operation region. This increases the opportunities to perform forced induction in the second middle-load region Y2 in which the basic port injection ratio RB is set to be large increases. On the other hand, in the engine operation region in which the forced-induction device 50 performs forced induction, the valve overlap period VO is set to be long. Therefore, when the forced-induction device 50 performs forced induction under an environment of low atmospheric pressure L and when fuel injection is performed using the basic port injection ratio RB as it is, the following problems occur. That is, as illustrated in part (a) of FIG. 3, the basic port injection amount FPB, which is the fuel injection amount of the port injection valve 4 corresponding to the basic port injection ratio RB, is considerably large. Therefore, the following is necessary to completely inject the basic port injection amount FPB from the port injection valve 4 before the valve closing timing GVE of the intake valve 9. That is, it is necessary to start the fuel injection of the port injection valve 4 before the end timing VOE of the valve overlap period VO. In this case, the fuel injected from the port injection valve 4 in the valve overlap period VO blows through to the exhaust passage 8.

Therefore, in the first treatment of the specific injection control, the port injection ratio R is reset according to the atmospheric pressure L. That is, the controller 100 calculates the corrected port injection ratio RM in which the amount of decrease from the basic port injection ratio RB increases as the atmospheric pressure L decreases (step S120). As illustrated in part (b) of FIG. 3, the following can be performed when the set port injection amount FPU, which is the fuel injection amount from the port injection valve 4 corresponding to the corrected port injection ratio RM, is less than or equal to the allowable port injection amount FPA illustrated in part (c) of FIG. 3. That is, even when the fuel injection by the port injection valve 4 is started from the end timing VOE of the valve overlap period VO, the port injection valve 4 can completely inject the set port injection amount FPU before the valve closing timing GVE of the intake valve 9. Therefore, when the set port injection amount FPU is less than or equal to the allowable port injection amount FPA (step S180: YES), the controller 100 sets the final target port injection amount FPF to the set port injection amount FPU (step S190). Then, the controller 100 causes the port injection valve 4 to start fuel injection from the end timing VOE of the valve overlap period VO. On the other hand, the controller 100 covers the reduction of fuel injected from the port injection valve 4 by the fuel injection from the direct injection valve 20. That is, the controller 100 sets the target direct injection amount FDF to the set direct injection amount FDU, which is the fuel injection amount from the direct injection valve 20 corresponding to the corrected port injection ratio RM (step S200). Then, the controller 100 causes the direct injection valve 20 to start fuel injection at an optimum timing.

As described above, in the first treatment, the port injection ratio R is corrected according to the atmospheric pressure L. With this correction, it is assumed that the basic port injection amount FPB illustrated in part (a) of FIG. 4 reduces to the set port injection amount FPU illustrated in part (b) of FIG. 4. However, as illustrated in (b) of FIG. 4, the set port injection amount FPU may be greater than the allowable port injection amount FPA illustrated in part (c) of FIG. 4. Such a situation may occur, for example, when the total fuel amount Fall is large, or the time from the end timing VOE of the valve overlap period VO to the valve closing timing GVE of the intake valve 9 is short due to the high engine rotation speed NE. When the set port injection amount FPU is greater than the allowable port injection amount FPA, the following problem occurs. That is, as illustrated in part (b) of FIG. 4, in order to completely inject the set port injection amount FPU before the valve closing timing GVE of the intake valve 9, the fuel injection of the port injection valve 4 needs to be started before the end timing VOE of the valve overlap period VO. In this case, the fuel injected from the port injection valve 4 in the valve overlap period VO blows through to the exhaust passage 8. That is, the problem of fuel blow-through still occurs.

Therefore, when the set port injection amount FPU is greater than the allowable port injection amount FPA (step S180: NO), the controller 100 performs the second treatment. That is, as illustrated in part (c) of FIG. 4, the controller 100 sets the final target port injection amount FPF to the allowable port injection amount FPA, not to the set port injection amount FPU (step S210). Then, the controller 100 causes the port injection valve 4 to start fuel injection from the end timing VOE of the valve overlap period VO. As a result, the port injection valve 4 can completely inject the required amount of fuel before the valve closing timing GVE of the intake valve 9. On the other hand, the controller 100 covers the difference value N between the set port injection amount FPU and the allowable port injection amount FPA by the direct injection valve 20. That is, the controller 100 sets the target direct injection amount FDF to a value obtained by adding the difference value N to the set direct injection amount FDU (step S220). Then, the controller 100 injects the target direct injection amount FDF from the direct injection valve 20. The direct injection timing FDS at this time is the same as that in the first treatment. That is, even when the difference value N is covered by the direct injection valve 20, the controller 100 uses the direct injection timing FDS calculated in accordance with the set direct injection amount FDU without recalculating the direct injection timing FDS.

Figure 4:
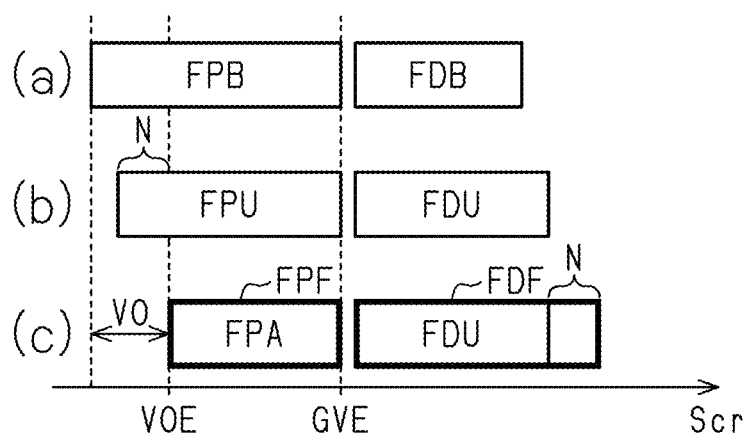
FIG. 4 is a diagram showing an example of setting of a fuel injection amount according to a second treatment.

Although FIG. 4 illustrates an example in which the direct injection timing FDS is set to a timing later than the valve closing timing GVE of the intake valve 9, the direct injection timing FDS may be set before the valve closing timing GVE of the intake valve 9. In addition, FIG. 4 merely schematically illustrates the injection amount of each injection valve, the injection timing, the opening/closing timing of each valve, and the like in order to describe the operation when the specific injection control is performed in an easy-to-understand manner, and these do not necessarily match the actual ones.

Advantages of Embodiment (1) As described in the above operation, when the internal combustion engine 1 is operated in the engine operation region in which blow-through of fuel may occur, the controller 100 reduces the port injection ratio R by performing the two-stage treatments. As a result, the target port injection amount FPF is set to a value less than or equal to the allowable port injection amount FPA. In this case, even when the port injection timing FPS is set after the end of the valve overlap period VO, the target port injection amount FPF can be completely injected from the port injection valve 4 before the valve closing timing of the intake valve 9. In such a configuration of the present embodiment, blow-through of fuel can be prevented by starting fuel injection by the port injection valve 4 from the end timing VOE of the valve overlap period VO. In addition, the controller 100 covers the entire reduction of the fuel injection amount from the port injection valve 4 by the fuel injection from the direct injection valve 20. Therefore, the total fuel amount Fall provided for one fuel combustion in the cylinder 18 does not change. Therefore, the influence of the fluctuation in the torque of the internal combustion engine 1 and the like caused by reducing the port injection ratio R is minimized.

(2) When the amount of fuel injected from the direct injection valve 20 is large, the following concerns arise. That is, the period required to completely inject the required amount of fuel from the direct injection valve 20 becomes long. Accordingly, the direct injection timing FDS is set to the crank position Scr that is significantly earlier than the specified crank position. In this case, the direct injection timing FDS may be, for example, a timing that is relatively earlier than the time at which the piston 6 is located at the bottom dead center of the compression stroke, that is, when the piston 6 is located near the top dead center. When the fuel injection is started at this timing, the amount of fuel adhering to the top surface of the piston 6 may increase. This makes it difficult for the fuel to be atomized. Thus, it is not preferable to excessively increase the fuel injection amount from the direct injection valve 20. Due to such circumstances, the correction value H used when reducing the port injection ratio R in the first treatment of the specific injection control is a value at which the fuel injection amount from the direct injection valve 20 does not increase so much. Therefore, the fuel injection amount of the port injection valve 4 to be reduced in the first treatment is also limited to a certain extent. Even if the first treatment is restricted as described above, in the specific injection process, the port injection ratio R is reset so that the target port injection amount FPF becomes the allowable port injection amount FPA in the second treatment. Therefore, blow-through of fuel can be reliably prevented.

As described in step S160 of the specific injection process, a relatively complicated process is required to calculate the direct injection timing FDS. When resetting the port injection ratio R in the second treatment, the processing load of the controller 100 increases if the direct injection timing FDS is re-calculated in accordance with the final target direct injection amount FDF. In this regard, in the present embodiment, even when resetting the port injection ratio R in the second treatment, the existing direct injection timing FDS already calculated based on the set direct injection amount FDU is used without recalculating the direct injection timing FDS. Therefore, the processing load on the controller 100 can be suppressed to a minimum while performing the two-stage treatment as described above.

Modifications

The above embodiment can be modified and implemented as follows. The above embodiment and the following modification can be implemented in combination within a range not technically contradicting each other.

The manner in which the second treatment of the specific injection control is performed is not limited to the example of the above embodiment. That is, in step S210, instead of setting the allowable port injection amount FPA as it is to the target port injection amount FPF, the fuel amount less than the allowable port injection amount FPA may be set to the target port injection amount FPF. Even in this case, the total fuel amount Fall can be supplied to the cylinder 18 by covering the difference between the total fuel amount Fall and the target port injection amount FPF by the fuel injection from the direct injection valve 20.

The method of calculating the direct injection timing FDS in the specific injection control is not limited to the example of the above embodiment. The method of calculating the direct injection timing FDS may be a method capable of setting an appropriate timing in consideration of protection of the ignition plug 5, exhaust emission, and the like. Accompanying the change in the method of calculating the direct injection timing FDS, the direct injection timing FDS may be set to a timing different from the direct injection timing FDS calculated in the manner of the above embodiment.

The direct injection timing FDS when the second treatment of the specific injection control is performed may be recalculated in accordance with the target direct injection amount FDF calculated in the second treatment. In this case, the fuel injection by the direct injection valve 20 can be started from the optimum timing for injecting the target direct injection amount FDF calculated in the second treatment.

The port injection timing FPS set by the specific injection control is not limited to the example of the above embodiment. The port injection timing FPS may be set to a timing later than the end timing VOE of the valve overlap period VO. For example, it is assumed that the set port injection amount FPU is smaller than the allowable port injection amount FPA. In this case, even if the port injection timing FPS is set to a timing later than the end timing VOE of the valve overlap period VO, the set port injection amount FPU can be completely injected from the port injection valve 4 before the valve closing timing of the intake valve 9. Furthermore, as in a modification described later, when the second treatment is eliminated, the port injection timing FPS may be set in the middle of the valve overlap period VO. Even in this case, at the timing as late as possible in the valve overlap period VO, the amount of fuel in which the fuel blows through to the exhaust passage 8 can be reduced to no small extent. The port injection timing FPS set by the specific injection control may be later than the port injection timing FPS set by the normal injection control.

Regarding the first treatment of the specific injection control, the method of correcting the port injection ratio R is not limited to the example of the above embodiment. In correcting the port injection ratio R, the correction value H may be added or subtracted instead of multiplying the correction value H. An appropriate correction value H may be set in the correction map according to the manner of correction. The correction method is not limited as long as the corrected port injection ratio RM in which the decrease width from the basic port injection ratio RB increases as the atmospheric pressure L decreases can be calculated.

In the above embodiment, the correction value H is determined focusing on the port injection valve 4 out of the direct injection valve 20 and the port injection valve 4. Alternatively, the correction value H may be determined focusing on the direct injection valve 20. Specifically, in step S120, a value obtained by subtracting the basic port injection ratio RB from 1 is calculated as the basic direct injection ratio. Then, the corrected direct injection ratio is calculated by multiplying the basic direct injection ratio by the correction value H. Then, in steps S130 and S140, the fuel injection amount from the respective injection valve is determined according to the corrected direct injection ratio. The correction value H may be determined so that such a manner can be realized. In this case, the correction map may have contents such that the correction value H increases as the atmospheric pressure L decreases. At this time, the correction value H in performing correction by multiplication may be set to a value greater than or equal to 1. Furthermore, as the correction value H in performing correction by multiplication, for example, a value obtained by dividing the standard atmospheric pressure by the atmospheric pressure L at the point at which the vehicle 300 is located may be adopted. Even in these cases, the amount of decrease of the port injection ratio R is set to be greater as the atmospheric pressure L becomes lower.

The second treatment of the specific injection control may be eliminated, and only the first treatment may be performed. By performing the first treatment, the port injection ratio R can be reduced according to the atmospheric pressure L. The set port injection amount FPU obtained by the first treatment may be greater than the allowable port injection amount FPA. In this case, as described in the above modification, the port injection timing FPS may be set within the valve overlap period VO. Even in this case, since the port injection ratio R is reduced by the first treatment as compared with the case in which the first treatment is not performed, the amount of fuel blown through to the exhaust passage 8 can be reduced to no small extent.

The first treatment of the specific injection control may be eliminated, and only the second treatment may be performed. That is, the correction according to the atmospheric pressure L may not be performed. For example, if the correction value H is treated as 1 in step S120, such a manner can be realized. Specifically, when the correction value H is set to 1, in step S180, the basic port injection amount FPB, which is the fuel injection amount from the port injection valve 4 corresponding to the basic port injection ratio RB, is compared with the allowable port injection amount FPA. Then, in a case in which the former is greater than the latter (step S180: NO), the second treatment is performed. Then, in step S210, the target port injection amount FPF is set to an allowable port injection amount FPA. Furthermore, in step S220, the difference between the basic port injection amount FPB and the allowable port injection amount FPA is included in the target direct injection amount FDF. Such a manner may be adopted.

In a case in which the first treatment of the specific injection control is eliminated and only the second treatment is performed, the injection amount smaller than the allowable port injection amount FPA may be set to the target port injection amount FPF as in the modification described above. The reduced amount may be included in the target direct injection amount FDF.

When the first treatment of the specific injection control is eliminated and only the second treatment is performed, the direct injection timing FDS may be any of the following. That is, the direct injection timing may be the direct injection timing FDS calculated in accordance with the basic direct injection amount FDB which is the fuel injection amount from the direct injection valve 20 corresponding to the basic port injection ratio RB. The direct injection timing FDS may be calculated in accordance with the target direct injection amount FDF calculated in the second treatment. The port injection timing FPS may be set so that the target port injection amount FPF can be completely injected before the valve closing timing of the intake valve 9.

In the specific injection control, the port injection ratio R may be set to be small by a method different from the first treatment and the second treatment. For example, in the specific injection control, regardless of the atmospheric pressure L at the point at which the vehicle 300 is located, a value obtained by reducing the basic port injection ratio RB by a predetermined fixed value may be calculated as the corrected port injection ratio RM. Then, the fuel corresponding to the corrected port injection ratio RM may be injected from each injection valve. The specific injection control may have contents of setting the port injection ratio R small and delaying the port injection timing FPS, as compared with the normal injection control.

A method of calculating each valve timing calculated in the process of specific injection control is not limited to the example of the above embodiment. For example, each valve timing may be calculated using a detection value of each of the following sensors. The sensors are a crank position sensor 34, an intake cam position sensor 35, and an exhaust cam position sensor 36. Any method can be used as long as each valve timing can be appropriately calculated.

Each map may be a formula instead of a table or a graph. Each map may appropriately represent a relationship between parameters specified in each map.

The manner in which each valve timing is adjusted in correspondence with the engine operation region is not limited to the example of the above embodiment. Regardless of the manner of adjustment of each valve timing, forced induction is performed by the forced-induction device 50 when the valve overlap period VO is greater than 0, and blow-through of fuel may occur when the port injection ratio R is large at that time. Specific injection control may be performed to prevent blow-through of fuel.

The content of the ratio map, the content of the forced induction map, and the manner of setting the valve overlap period VO may be different from those in the above embodiment. Accompanying therewith, the relationship among the forced induction start load factor KLA, the basic port injection ratio RB, and the length of the valve overlap period VO may be different from that in the example of the above embodiment. Even in this case, the specific injection control may have contents of setting the port injection ratio R small and delaying the port injection timing FPS as compared with the normal injection control.

The initial values of the intake valve timing and the exhaust valve timing are set in the same mode as in the above embodiment. In this case, regarding the reference cylinder, the intake valve timing set by the intake valve variable device 13 and the exhaust valve timing set by the exhaust valve variable device 14 have the following relationship. That is, the crank position Scr at which the exhaust valve 10 reaches the valve closing timing when the retardation amount of the exhaust valve timing is maximized is on the retarded side from the crank position Scr at which the intake valve 9 reaches the valve opening timing when the intake valve timing is at the initial value. Now, it is assumed that the specific injection control is performed under a situation in which the retardation amount of the exhaust valve timing is maximized and the valve overlap is performed. The port injection timing FPS at this time is assumed to be the end timing VOE of the valve overlap period VO, that is, the valve closing timing of the exhaust valve 10. This mode is referred to as a specified mode. In the normal injection control, the port injection timing FPS is basically set to a prompt timing after the valve opening timing of the intake valve 9. For example, it is assumed that the valve opening timing of the intake valve 9 and the port injection timing FPS of the normal injection control are substantially the same. In this case, the port injection timing FPS in the case in which the normal injection control is performed when the intake valve timing is at the initial value becomes the most retarded timing in the case in which the normal injection control is performed. As compared with the port injection timing FPS at this time, the port injection timing FPS when the specific injection control is performed in the specified mode described above, that is, the valve closing timing of the exhaust valve 10 when the retardation amount of the exhaust valve timing is maximized is further on the retarded side. Therefore, if the assumption that the valve opening timing of the intake valve 9 and the port injection timing FPS of the normal injection control are substantially the same is satisfied, the following can be said. That is, when the specific injection control is performed in the specified mode, the port injection timing FPS of the specific injection control becomes later than the port injection timing FPS of the normal injection control.

The overall configuration of the internal combustion engine 1 is not limited to the example of the above embodiment. For example, the number of cylinders 18 may be changed. The intake valve variable device 13 may be of a hydraulically driven type. The same applies to the exhaust valve variable device 14. Furthermore, for example, if the first treatment is not performed, the atmospheric pressure sensor 30 may be eliminated. The internal combustion engine 1 merely needs to include the port injection valve 4, the direct injection valve 20, and the forced-induction device 50.

The overall configuration of the vehicle 300 is not limited to the example of the above embodiment. For example, the vehicle 300 may include not only the internal combustion engine 1 but also a generator motor as a drive source of the vehicle 300.

The controller 100 is not limited to a CPU, a GPU, or a TPU that executes software processing. For example, the controller 100 may include hardware circuits dedicated to executing at least part of the processes executed by the software in the above-described embodiments. The dedicated hardware circuits include, for example, an application specific integrated circuit (ASIC). That is, the controller 100 may be processing circuitry that has any one of the following configurations (a) to (c).

(a) Processing circuitry including a processor that executes all of the above-described processes according to programs and a program storage device that stores the programs.

(b) Processing circuitry including a processor and a program storage device that execute part of the above-described processes according to the programs and a dedicated hardware circuit that executes the remaining processes.

(c) Processing circuitry including a dedicated hardware circuit that executes all of the above-described processes.

Multiple software processing devices each including a processor and a program storage device and multiple dedicated hardware circuits may be provided.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine, wherein the internal combustion engine includes:
   a port injection valve that injects fuel into an intake passage;
   a direct injection valve that directly injects fuel into a cylinder without passing through the intake passage; and a forced-induction device that performs forced induction of intake air, a ratio of an amount of fuel injected from the port injection valve with respect to a total amount of fuel supplied for one fuel combustion in the cylinder is defined as a port injection ratio, the controller comprises processing circuitry, and the processing circuitry is configured to, in a case in which a condition is satisfied that the forced-induction device is in an operation state of performing forced induction and the internal combustion engine is in an engine operation region in which a valve overlap period is greater than zero, by setting the port injection ratio to be small and delaying a start timing of fuel injection from the port injection valve as compared with a case in which the condition is not satisfied, use a time later than the valve overlap period as a start timing of fuel injection from the port injection valve, and set the port injection ratio so that an amount of fuel injected from the port injection valve is less than or equal to an allowable port injection amount that is an amount of fuel that can be injected from the port injection valve in a period from the start timing until closing of an intake valve.

2. The controller of the internal combustion engine according to claim 1, wherein the internal combustion engine further includes an atmospheric pressure sensor that detects an atmospheric pressure, and the processing circuitry is configured to set an amount by which the port injection ratio is reduced to be greater as the atmospheric pressure detected by the atmospheric pressure sensor becomes lower.

3. A control method for an internal combustion engine, wherein the internal combustion engine includes:

a port injection valve that injects fuel into an intake passage;

a direct injection valve that directly injects fuel into a cylinder without passing through the intake passage; and a forced-induction device that performs forced induction of intake air, a ratio of an amount of fuel injected from the port injection valve with respect to a total amount of fuel supplied for one fuel combustion in the cylinder is defined as a port injection ratio, the control method comprises, in a case in which a condition is satisfied that the forced-induction device is in an operation state in which the forced-induction device performs forced induction and the internal combustion engine is in an engine operation region in which a valve overlap period is greater than zero, by setting the port injection ratio to be small and delaying a start timing of fuel injection from the port injection valve as compared with a case in which the condition is not satisfied, using a time later than the valve overlap period as a start timing of fuel injection from the port injection valve, and setting the port injection ratio so that an amount of fuel injected from the port injection valve is less than or equal to an allowable port injection amount that is an amount of fuel that can be injected from the port injection valve in a period from the start timing until closing of an intake valve.

* * * * *